Dec. 16, 1941.      M. COHEN      2,266,309
BELT WASHER OR THE LIKE
Filed Sept. 30, 1940      2 Sheets-Sheet 1

Inventor:
Morris Cohen
By: A. Trevor Jones
Atty.

Dec. 16, 1941.    M. COHEN    2,266,309
BELT WASHER OR THE LIKE
Filed Sept. 30, 1940    2 Sheets-Sheet 2

Inventor:
Morris Cohen
By: A. Trevor Jones
Atty.

Patented Dec. 16, 1941

2,266,309

UNITED STATES PATENT OFFICE 2,266,309

BELT WASHER OR THE LIKE

Morris Cohen, Kansas City, Mo., assignor to Interstate Bakeries Corporation, Kansas City, Mo., a corporation of Delaware Application September 30, 1940, Serial No. 359,041

3 Claims. (Cl. 198—230)

This invention relates to belt washer or the like more particularly for cleaning belts of conveyors used in bakery plants.

To facilitate cooling of the bakery products, these belts are commonly of the wire type so that air can circulate therethrough. In practice, the cakes are taken out of the pans in which they were baked and laid on the belt. After the belt with the cake thereon travels a short distance the cake is cooled sufficiently so as to be ready for icing. At this point, an operator may coat the cake with the usual icing or frosting, and the cake then moves along with the belt for an interval until the icing is dry or set, whereupon the cake is picked up and wrapped in the usual way, generally by machine.

While the cake is cooling on the belt it has been observed that the cake imparts a certain amount of shortening to the belt, thereby making the belt greasy, and also some of the icing generally falls off the cake and gets on the belt, so that even in one operation the belt accumulates foreign particles which are undesirable from the standpoint of a bakery plant desiring to maintain neatness and cleanliness.

Various means have been employed heretofore to clean such belts, one of which has been the use of a steam hose. This has been found objectionable in that it entails considerable labor and the steam escapes into the shop with attendant objections, in addition to the fact that the operation itself does not thoroughly remove the foreign particles from the belt.

It has been also attempted to clean the belts by the use of rotating brushes. This expedient has been found to give the belt merely a superficial cleaning, the brushes failing to get into the various crevices and joints of the belt.

A third expedient employed heretofore has been to have the belt on its return run pass through a tank of hot water and then encounter a steam spray, but one of the serious objections to this expedient has been that the belt would become so wet that it would slip on its pulleys, in addition to the fact that a large amount of hot water and steam was necessary and that the belt in going through the tank would be under abnormal stress, frequently causing it to stretch and interfering with its normal movement.

The present invention aims to provide a device which obviates the objections to the expedients heretofore used and which at the same time cleanses the belt more rapidly and more thoroughly. The present invention contemplates the novel expedient of causing the belt, substantially without undue displacement from its normal run, to pass between a pair of rows of oppositely directed nozzles which force a cleansing fluid such as heated water onto both faces of the belt and over the entire width of the belt simultaneously, the water being relatively small in amount but under substantially high pressure.

The invention will be readily understood by reference to the accompanying drawings, in which—

Figure 1:
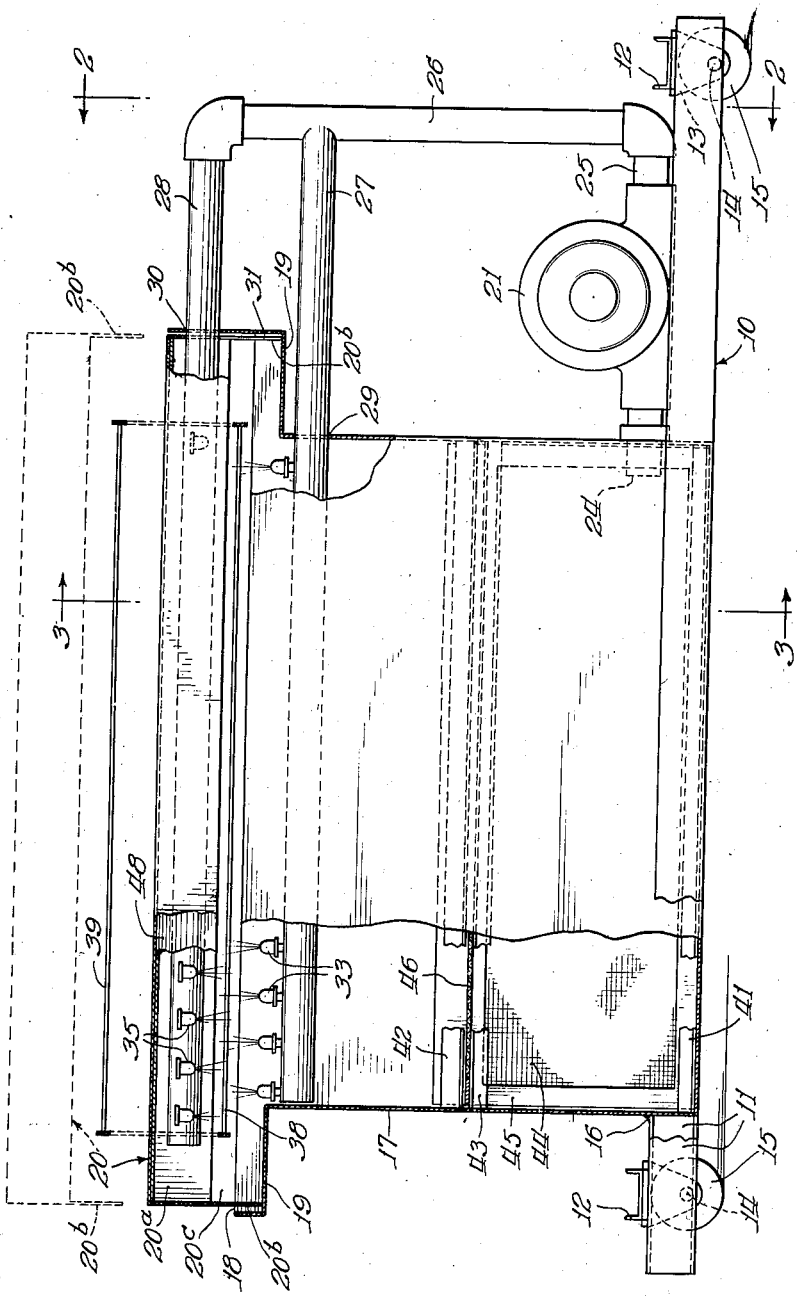
Figure 1 is a side elevational view of the device, parts being shown in section.
Figure 2:
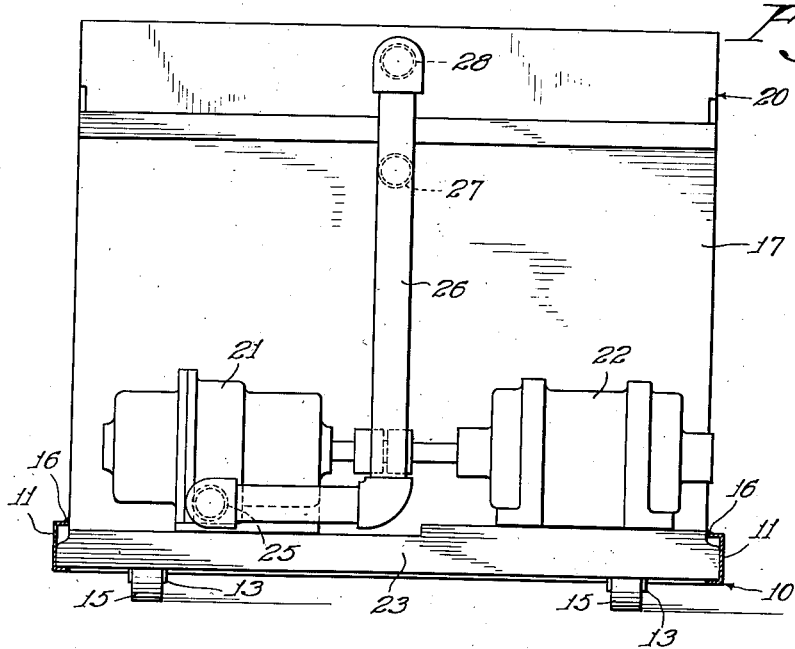
Figure 2 is an end elevational view of the device, parts being shown in section taken on the line 2—2 of Fig. 1 and looking in the direction of the arrows.
Figure 3:
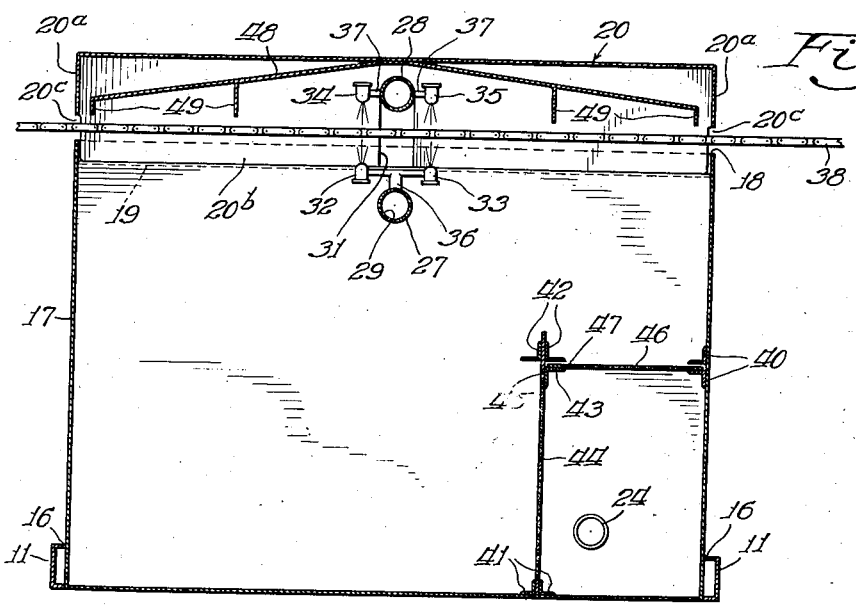
Figure 3 is a cross-sectional taken on the line 3—3 of Fig. 1 and looking in the opposite direction.

Referring in detail to the illustrative construction shown in the drawings, the carriage 10 may be formed of a pair of parallel channels 11 connected at each end by the inverted channel beams 12 from which depend brackets 13, the latter providing journals for the axles 14 of rollers 15 of which there are in this instance four, to support the device as a whole upon the floor of a bakery or the like, and mobile thereon. Secured to the side channels 10 as by welding at 16 is a tank 17 advantageously formed of sheet metal and open at its top as at 18. The tank 17 is elongated in the direction of the channels 10 and its top is further elongated in this direction at each end as at 19. A removable cover 20 is superposed over the open upper end 18 of the tank 17 and this cover is also elongated so as to fit somewhat snugly into the extensions 19.

A pump 21 and motor reducer 22 connected to the pump are carried by the channels 10 at one end of the tank 17 as on a platform 23 at this end. The pump has an intake 24 from the interior of the tank 17, and the output side 25 of the pump is in communication with a vertical pipe 26 which at its top has two vertically spaced horizontal branches 27 and 28. The lower branch 27 extends into the top part of the tank 17 just below the tank extensions 19, a circular opening 29 in the tank end receiving the pipe branch 27 therethrough and the free end of the branch pipe 27 terminating immediately adjacent the opposite end wall of the tank, as best shown in Fig. 1. The upper branch pipe 28 is in the plane of the extensions 19 of the tank end walls, this extension being perforated as at 30 for the passage of the branch pipe therethrough and the free end of this branch pipe 28 terminating in the extension 19 at the opposite end of the tank. The removable cover 20 has an open ended slot 31 horizontally aligned with the perforation 30 in an end 20b of the cover so that the cover can be slipped over the branch pipe 28.

Each of the branch pipes 27 and 28 carries at least a row and desirably as in this instance a pair of rows of nozzles 32, 33 for the branch pipe 27, and 34, 35 for the branch pipe 28, the nozzles of the branch pipes being oppositely directed. The nozzles 32 and 33 are arranged in pairs, each pair being carried by a common T-shape conduit 36 secured into the upper side of the branch pipe 27, while the nozzles 34, 35 are each carried by an individual conduit 37 secured directly into opposite sides of the branch pipe 28.

So constructed and arranged, the mobile device as a whole may be moved into cooperation with a belt to be cleaned, such as the lower run 38 of a wire rod or the like conveyor having the upper run 39. The runs 38 and 39 of the endless conveyor belt are suitably supported in any manner well known to the art, and which need not be here shown, since it forms no part of the present invention. Suffice it to say that the mobile device here illustrated is moved laterally on the rollers 15 in such manner that the lower run 38 of the belt is positioned between the lower and upper branch pipes 27 and 28 and between the plurality of pairs of oppositely directed nozzles carried by these pipes, the rows of nozzles being of sufficient length to be substantially as wide as the belt 38. Thereupon the movable cover 20 is slipped onto the top of the tank 17, the cover being thus positioned between the runs 38 and 39 of the belt and covering the lower run 38 transversely throughout a substantial longitudinal extent thereof.

When so positioned the pump 21 may be set into operation by means of the motor reducer 22 and appropriate electrical controls therefor not necessary to be here shown, and the tank 17 having been previously filled to a point say just below the branch pipe 27 with a suitable cleansing fluid such as hot water, the water is forced at a relatively high pressure and in the form of a spray through the nozzles onto the belt 38 throughout the entire transverse extent thereof and directed against opposite faces of the belt while the belt is moved therebetween by means of the usual conveyor machinery not here shown, the belt moving through the space between the open top 18 of the tank 17 and the sides 20a of the cover 20, which are shorter than the ends 20b of the cover to leave a slot 20c through which the belt may move.

The pump 21 is desirably adapted to operate at approximately eighty pound pressure with a capacity of approximately thirty gallons per minute so that a relatively small amount of water but at relatively high pressure is emitted from the nozzles. The nozzles may have a one-eighth inch mouth for this purpose and are preferably staggered transversely of the belt as best shown in Fig. 1.

In order that particles of foreign matter dropped off of the belt with the water are not re-circulated through the pump, I have provided a strainer in the form of a screen guard over the inlet 24 and which guard will next be described. Extending lengthwise of the tank 17 are a plurality of pairs of spaced apart angle member screen retainers, one such pair 40 being suitably secured as by welding to a vertical wall of the tank, another such pair 41 to the bottom wall of the tank, and a third such pair 42 secured to the end walls of the tank and arranged to define with the angle members 40 and 41 a rectangle in one side of the tank covering the pump inlet 24. Below the pair of angle members 42 is another angle member 43. A screen 44 having a frame 45 fits snugly into the interior of the tank lengthwise thereof and between the angle members 42 and also between the angle members 41, these angle members being spaced apart sufficiently to snugly receive the frame 45. Another screen 46 having a frame 47 is slipped horizontally between one of the angle members 42 and the angle member 43 and also between the angle members 40, these latter being similarly spaced apart for this purpose. Thus, the screens 44 and 46 form a guard over the pump inlet 24 so that any water falling back into the tank 17 must pass through these screens to reach the pump inlet. The screens are readily removable for cleaning, when the device is not in use with a conveyor belt, by first removing the cover 20 and then lifting out the screen 44 which readily slips from between the angles retaining it. After the screen 44 is removed, the screen 46 may then be slid horizontally from between its angle retainers.

The cover 20 desirably has an inner apron 48 having a series of vertical baffles 49 depending therefrom which assist in directing the sprayed water back into the tank 17. It has been found that this arrangement not only thoroughly cleanses the belt but that the belt as it comes from the device or within a short distance therefrom is desirably dry and non-greasy, so that it will not slip on its rollers.

Such changes may be made as fall within the scope of the following claims without departing from the invention.

Having described my invention, I claim:

1. In a mobile conveyor endless belt washer device of the class described, the combination of a tank, a plurality of pairs of rows of nozzles mounted at the upper end of said tank arranged for receiving the moving belt of a conveyor or the like therebetween, the rows of nozzles extending laterally substantially as wide as the belt, a removable cover for the nozzles, vertical baffles carried by said cover, a pump and motor carried by the device, connections from said pump to said nozzles including a vertical pipe and two horizontal branch pipes whereby a stream of fluid under pressure may be directed against said belt on opposite faces thereof and throughout the width thereof, said pump being at the lower end of said tank, a removable screen strainer over said pump, and roller support means for the device.

2. In a mobile conveyor belt washer device of the class described, the combination of a tank of substantial depth adapted to hold a body of cleaning liquid, a pair of beams supporting said tank, a plurality of pairs of rollers supporting said beams, said device being adapted to be rolled into position transversely of a conveyor belt and the tank being enlarged at its top in said direction transverse to said belt, a plurality of pairs of vertically spaced apart rows of nozzles mounted at the upper end of said tank arranged for receiving the moving conveyor belt therebetween, said nozzles having mouths of approximately one-eighth inch diameter, the rows of nozzles extending laterally substantially as wide as the said belt and wider than the reduced lower end of the tank, a removable cover for the tank, said cover being elongated as the upper part of the tank is elongated in the direction of said beams to extend across said belt and said rows of nozzles, an inner apron carried by said cover, said apron having a series of vertical baffles depending therefrom, said baffles extending in a direction transverse to said belt and being spaced apart in the direction in which the belt moves through said tank, a pump and motor carried by said beams at one end thereof spaced laterally of said belt, connections from said pump to said nozzles including a vertical pipe spaced laterally of said belt and a pair of horizontal branch pipes communicating with said vertical pipe and extending transversely across said belt, one of said branch pipes being adjacent each of the pairs of rows of nozzles and the upper of said branch pipes being in the region of said cover, said cover being cut away for the passage of said branch pipe thereinto, an inlet pipe from said tank to said pump, and removable strainer screens carried within said tank and covering the said inlet pipe.

3. In a mobile conveyor endless belt washer, the combination of a mobile carriage adapted to be moved into position beneath an endless belt conveyor supported exteriorly of the washer, means for receiving the lower run of the conveyor belt therein and between a pair of vertically spaced apart branch pipes, a cover for said pipes and said lower conveyor belt run, a tank mounted on said carriage and also covered by said cover, and pumping mechanism communicating with said tank and said branch pipes.

MORRIS COHEN.